United States Patent [19]
Jarvis

[11] 3,858,996
[45] Jan. 7, 1975

[54] BRACKET CLIP

[75] Inventor: Edward M. Jarvis, Ambler, Pa.

[73] Assignee: Standard Pressed Steel Co., Jenkintown, Pa.

[22] Filed: Oct. 19, 1972

[21] Appl. No.: 298,826

[52] U.S. Cl................. 403/353, 52/760, 248/223, 24/221 R
[51] Int. Cl............................................ G09f 7/00
[58] Field of Search ........... 287/189.35, 49, 50, 51, 287/119 R, 59; 24/221 R; 292/213, 218; 248/223

[56] References Cited
UNITED STATES PATENTS

| | | | |
|---|---|---|---|
| 1,167,899 | 1/1916 | Henderson | 287/189.35 |
| 2,533,799 | 12/1950 | Haydu | 287/189.35 X |
| 2,596,332 | 5/1952 | Flora et al. | 287/189.35 X |
| 3,017,205 | 1/1962 | Williams | 287/49 |
| 3,436,108 | 4/1969 | Van Buren | 287/189.35 |
| 3,589,660 | 6/1971 | Dunckel | 287/189.35 X |

Primary Examiner—Jordan Franklin
Assistant Examiner—Wayne L. Shedd

[57] ABSTRACT

A bracket clip to be secured to a vertical support post such as an H-post used in the construction of open shelving units. The clip is provided with a pair of extending tab members offset at an angle with the tabs adapted to be engaged in a trapezoidal-shaped slot in the support post. The tabs of the clip are inserted in the slot in the support post while the clip is maintained at an angle and the clip is rotated to engage the tabs within the slot in the support post so that the tabs grip the post and securely fix the bracket clip to the post.

6 Claims, 8 Drawing Figures

PATENTED JAN 7 1975

BRACKET CLIP

The present invention relates to bracket clips and more particularly to bracket clips which may be readily mounted on a support member.

In the erection and stabilization of open shelving units it is necessary to provide sway braces or back panels to interconnect standing vertical support members and to impart a degree of rigidity to the shelving units. Where a plurality of shelving units are provided it is also desirable at times to attach one unit to an adjacent unit. Accordingly, it is necessary to provide a means of attaching sway braces or back panels to vertical support posts and to attach adjacent units.

Heretofore, bracket clips have been provided for attachment to vertical support members by nut and bolt assemblies but such bracket clips have the inherent disadvantage that often the shelving units are assembled in confined areas so that it is difficult to gain access to both the head of a bolt and the associated nut to insure an effective clamping joint. Other bracket clips have been devised with complicated interlocking configurations but such clips are difficult to manipulate and do not lend themselves to facile installation procedures.

Accordingly, it is an object of the present invention to provide a bracket clip which is simple and economical to manufacture and which may be installed with a minimum of difficulty and effort.

It is a further object of the present invention to provide a bracket clip which interlocks positively and securely on an associated support member merely by inserting the bracket clip and rotating it to a securely engaged position.

A still further object of the present invention is to provide a bracket clip which may be used to join adjacent structures such as shelving units such that when the bracket clips are mounted in back-to-back relationship withdrawal of the bracket clip from the support structure is precluded.

These and other objects of the present invention will be more readily apparent after consideration of the following specification in conjunction with the accompanying drawing.

Figure 1:
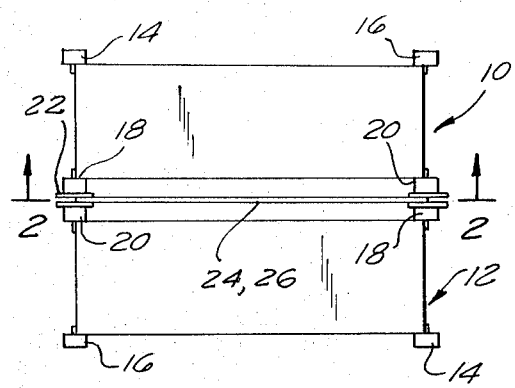
FIG. 1 is a schematic plan view of open shelving units joined in back-to-back relationship utilizing the bracket clip of the present invention.
Figure 2:
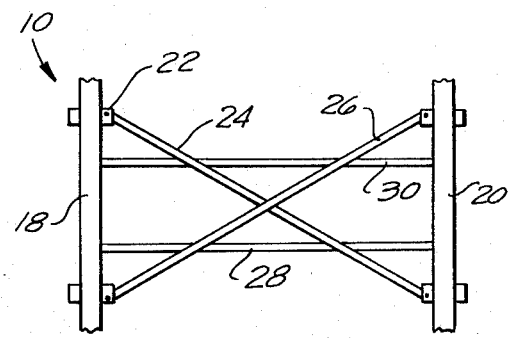
FIG. 2 is an elevational view taken along the line 2—2 of FIG. 1.

With reference to the drawings and particularly FIGS. 1 and 2, a pair of identical shelving unit assemblies 10 and 12 are shown with each of the units comprising four upstanding vertical support members 14, 16, 18 and 20. As best seen in FIG. 2, the bracket clip 22 of the present invention is secured to the upstanding support posts 18 and 20 at spaced vertical locations and crossed sway brace members 24 and 26 are provided to impart rigidity to the shelving unit 10 or 12 with each end of the sway braces 24 and 26 secured to the bracket clip 22. Horizontal shelving members 28 and 30 are also provided to complete the structure.

Figure 3:
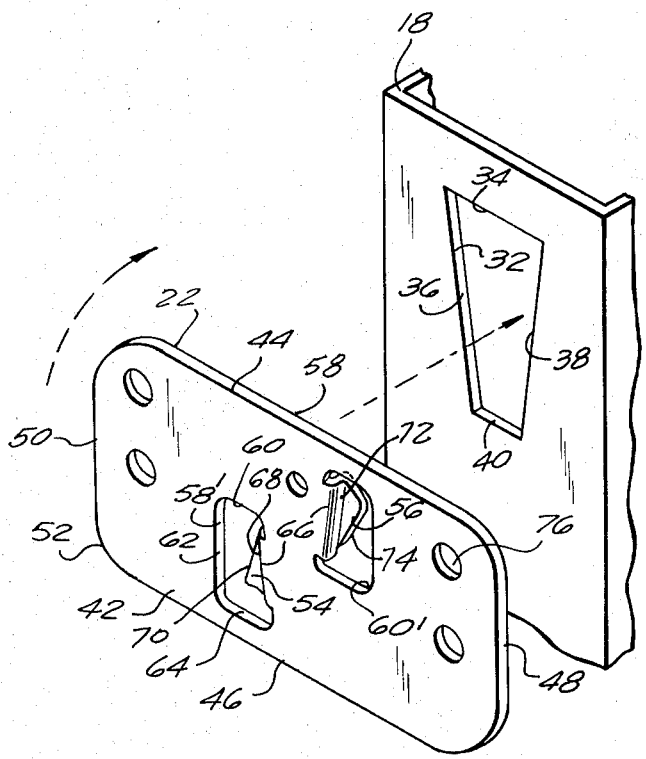
FIG. 3 is an exploded perspective view showing the bracket clip of the present invention prior to its installation in a support member.
Figures 7, 8:
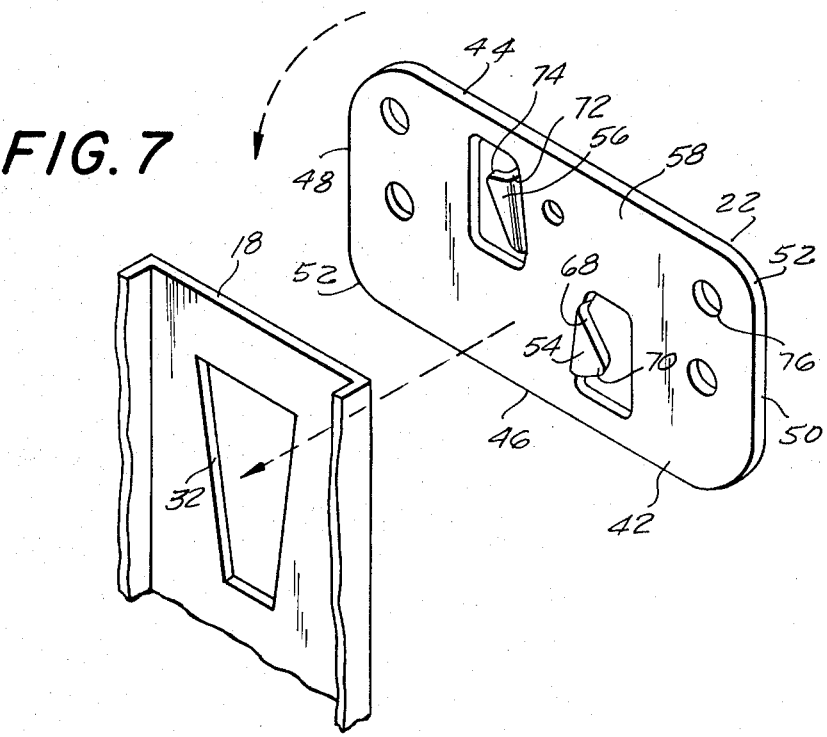
FIG. 7 is an exploded perspective view similar to FIG. 3 showing the opposite side of the bracket clip of the present invention.
FIG. 8 is a sectional view showing the bracket clips of the present invention used to join support members in back-to-back relationship.

Referring now to FIGS. 3 and 7, a typical upstanding support member 18 is shown preferably an H-post, i.e., a post having an H-shape in cross-section. The support post 18 is provided with a trapezoidal-shaped slot 32 at spaced intervals along the post 18. Each slot 32 is defined by an upper edge 34 and lateral edges 36 and 38 tapering inwardly toward a lower edge 40 which is shorter in length than the upper edge 34.

The bracket clip 22 comprises a substantially rectangular plate member 42 of sheet metal or the like having opposed longitudinal edges 44 and 46 and opposed lateral edges 48 and 50. Plate member 42 is also preferably provided with rounded corners 52. Locking tabs 54 and 56 extend outwardly from one face 58 of the bracket clip 22 with the tabs 54 and 56 being oriented on each side of a plane passing midway between the lateral edges 48 and 50 and also being laterally offset from each other.

The locking tabs 54 and 56 are preferably formed from material obtained by cutting out trapezoidal-shaped openings 58' and 60', respectively, in plate 42. Tab 54 is formed from cutout 58 by cutting plate 42 along a surface 60 substantially parallel to longitudinal edge 44, intersecting surface 62 substantially parallel to lateral edge 50 and along intersecting surface 64 substantially parallel to longitudinal edge 46. Surface 64 is longer in length than surface 60 so that when the material removed from the cutout 58 is folded outwardly the surface 66 of cutout 58' is inclined at an angle which is approximately equal to the angle of inclination of edge 36 of slot 32. Thus, the tab 54 is formed into an L-shaped member having an angularly disposed leg segment 68 substantially perpendicular to face 58 of the clip 22 and a leg segment 70 formed into a triangular configuration substantially parallel to, but spaced from, face 58 of the clip 22.

Tab 56 is formed in like manner so that the L-shaped tab 56 includes an angularly disposed leg segment 72, at an angle of inclination substantially equal to the angle of inclination of edge 38 in slot 32, perpendicular to face 58 and a triangular segment 74 disposed parallel to, but spaced from, face 58.

The leg segment 68 of tab 54 and the leg segment 72 of tab 56 are within respective planes passing through the longitudinal extent of the leg segment which if extended intersect each other.

Figure 4:
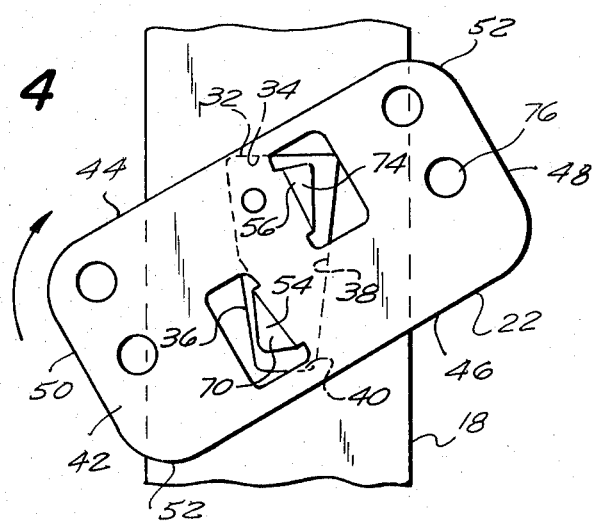
FIG. 4 is an elevational view showing an initial assembly step of the bracket clip of the present invention on a support member.

The triangular configuration for leg segments 70 and 74 are formed to permit ease of insertion of the tabs through slot 32. As best seen in FIG. 4 the triangular shape of the leg segments 70 and 74 are dimensioned so that the tab extends readily into slot 32 which the shape of the tab dimensioned to pass freely within the portion of slot 32 defined by the intersection of edges 36 and 40 for tab 54 and 34 and 38 for tab 56. The laterally offset position of tabs 54 and 56 also are a factor in the ease of insertion of the tabs into slot 32.

The bracket clip 22 is also provided with bolt access holes 76 therethrough for the connection of sway brace members or an adjacent clip by means of a nut and bolt assembly.

Figure 5:
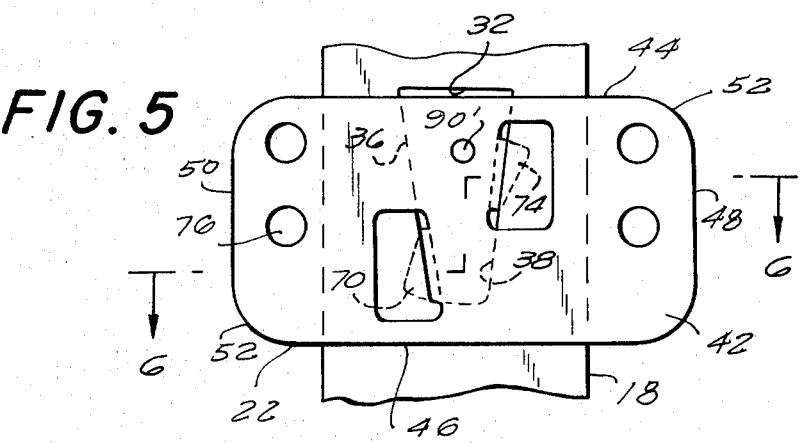
FIG. 5 is a view similar to FIG. 4 showing the bracket clip of the present invention in an assembled state.
Figure 6:
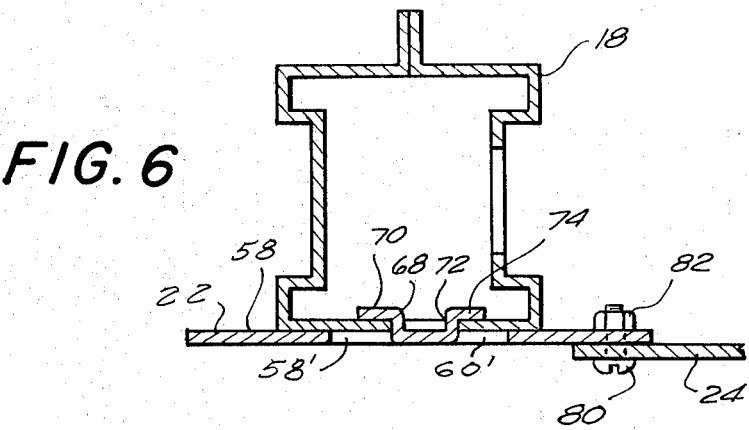
FIG. 6 is a sectional view taken on the line 6—6 of FIG. 5.

Reference is now made to FIGS. 4 through 6 for an illustration of the manner in which the clip 22 is securely engaged within slot 32 of a support member. As best seen in FIG. 4, the initial assembly step comprises placing the clip 22 adjacent the support member 18 upon which it is to be engaged with the clip disposed at an angle with respect to the longitudinal axis of the trapezoidal-shaped slot 32 therein.

In this orientation the laterally offset leg segments 70 and 74 of the tabs 54 and 56, respectively, pass freely through slot 32. At this juncture of the assembly the clip 22 is rotated in the direction of the arrow shown in FIG. 4 so that the longitudinal axis of the clip becomes perpendicular to the longitudinal axis of the slot 32, as shown in FIG. 5. With the clip 22 in this orientation the leg segments 70 and 74 of tabs 54 and 56, respectively, overlie the edges 36 and 38 of slot 32 and preclude the disengagement of the clip from the support member 18. The clip is then moved in line with the longitudinal axis of the slot 32 until the inclined surface 66 of tabs 54 and 56 rest along edges 36 and 38 of slot 32.

With the installation as shown in FIG. 6, it is seen that the lateral edges of clip 22 extend beyond support member 18 so that sway brace member 24 can be readily secured to the bracket clip 22 by a bolt 80 and a nut 82 with the shank of the bolt 80 passing through one of the exposed bolt access holes 76 in clip 22.

As seen in FIG. 8, a pair of support posts 18 and 20 are interconnected in back-to-back relationship by joining mating face-to-face clips 22 and 22' secured respectively within support posts 18 and 20. The posts 18 and 20 could be joined directly or, as shown in FIG. 8, may be joined by a bolt 90 and nut 92 with a sway brace member 24 interposed between the face-to-face bracket clip 22 and 22'. An advantageous feature of the back-to-back joining of support posts 18 and 20 is that the bracket clip 22 in support post 18 must be rotated in a counterclockwise direction in order to disengage the clip from support post 18. The bracket clip 22' in support post 20, because it is facing in the opposite direction, is rotated into tighter engagement when bracket clip 22 is subjected to a force tending to rotate clip 22 out of engagement. Similarly, if a force is imparted to the bracket clip 22' to disengage this clip, the clip 22 rotates into tighter engagement with support post 18 and prevents disengagement. Thus, the back-to-back joining of adjacent support members 18 and 20 by the bracket clips 22 and 22' of the present invention provides a counterbalancing effect which insures that the clips will not be inadvertently disengaged from their associated support posts.

Where the bracket clip of the present invention is not used in a back-to-back use, a self-threading screw may be installed through aperture 90' in the clip to preclude the clip from rotating out of engagement.

It is thus seen that the bracket clip of the present invention provides an economically simple and expedient method for engaging a bracket clip upon a support post wherein the bracket clip is securely and positively engaged on a supporting post and where the clip resists inadvertent disengagement from the supporting post.

What is claimed is:

1. A bracket clip in combination with a support member,
   said bracket clip comprising a plate member having first and second tab members extending from one side of said plate member,
   each said tab member being substantially L-shaped in cross-section and including a first leg segment extending outwardly from said plate member and a second leg segment extending substantially parallel to but spaced from said plate member,
   said first leg segment of said first tab member defining a plane passing through the longitudinal extent of said leg segment and the extension of said plane intersecting the extension of a plane defined by the longitudinal extent of the first leg segment of said second tab member, whereby said first leg segments are disposed at an angle of inclination,
   said second leg segment of each said tab member extending outwardly from said first leg segment, said second leg segments extending from said first leg segments in generally opposite directions,
   said support member including a slot therein defined by spaced, substantially parallel upper and lower edges and spaced lateral edges disposed to taper inwardly at an angle of inclination complementary to the angle of inclination of said first leg segments of said tab members,
   said first leg segments being spaced apart such that said tab members of said bracket clip are freely insertable within said slot when said bracket clip is positioned in a first position with respect to said slot, the opposite outer edges of said first leg segments being spaced apart a distance no greater than the distance between said upper and lower edges of said slot and wherein said second leg segments of said tab members overlie said lateral edges when said bracket clip is rotated to a second position angularly offset from said first position thereby to securely join said clip to said support member.

2. A bracket clip and support member as defined in claim 1 wherein said first and second tab members are laterally offset from each other on said plate member thereby to facilitate insertion of said tab members within said slot in said support member.

3. A bracket clip and support member as defined in claim 1 wherein said second leg segment of each said tab member has a triangular configuration in plan to facilitate insertion of said tab members within said slot in said support member.

4. A bracket clip and support member as defined in claim 1 wherein said plate member is substantially rectangularly shaped in plan having opposed longitudinal and lateral edges and wherein said first and second tab members are oriented on each side of a plane passing midway between said lateral edges of said plate member and are laterally offset on said plate members.

5. The combination as defined in claim 1 wherein said plate member is substantially rectangularly shaped in plan having opposed longitudinal and lateral edges and wherein said first and second tab members are oriented on each side of a plane passing midway between said lateral edges of said plate member and are laterally offset on said plate member, said slot has a longitudinal axis and is trapezoidal-shaped with said tapered lateral edges tapering inwardly toward the longitudinal axis of said slot and said second leg segments of each said tab member have a triangular configuration in plan, said first leg segments being spaced apart a distance and said triangular configurations being of a size such that said second leg segments pass freely into said slot when said bracket clip is maintained in said first position wherein said plane between the lateral edges of said clip is disposed at an angle with respect to said longitudinal axis of said slot and said second segments overlie said lateral edges of said slot when said clip is rotated to said second position wherein said plane intersects said longitudinal axis of said slot.

6. The combination as defined in claim 5 wherein said clip in said second position includes a lateral segment extending beyond said support member, said segment including a bolt access hole therethrough providing a means to secure a second support member to said clip.

* * * * *